July 11, 1950
O. SOERGEL
2,514,809
DUSTLESS HEAVY DUTY SUCTION CLEANER
Filed Dec. 5, 1945
2 Sheets-Sheet 1
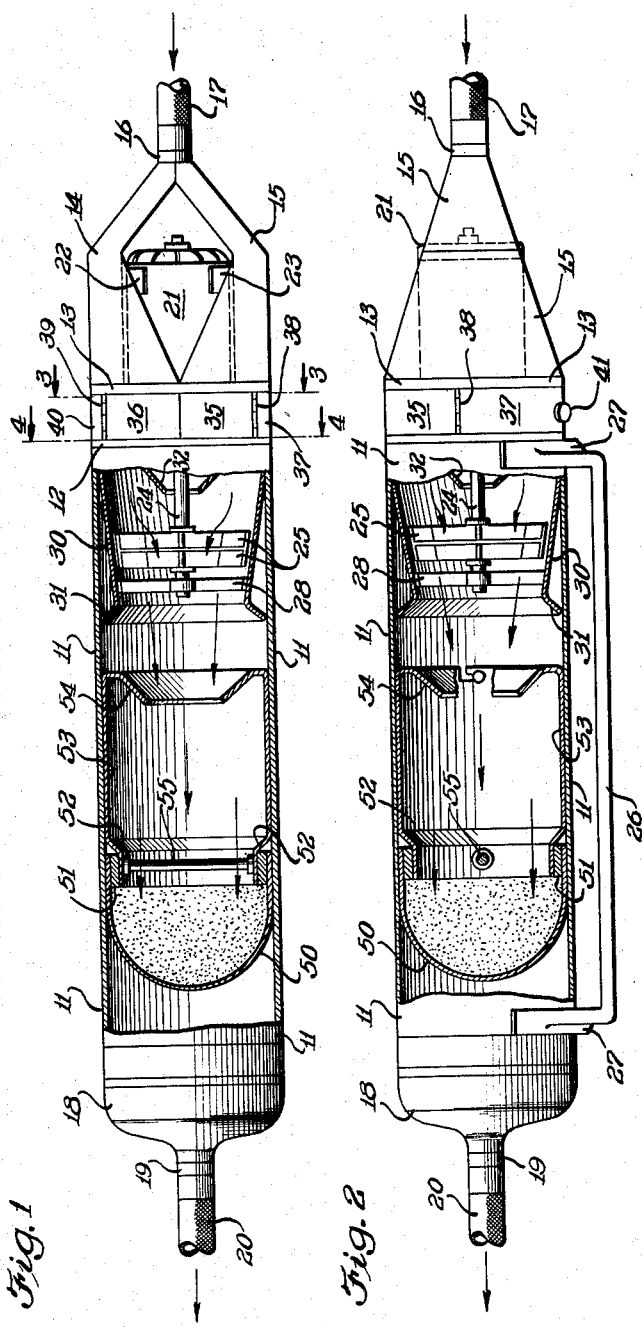
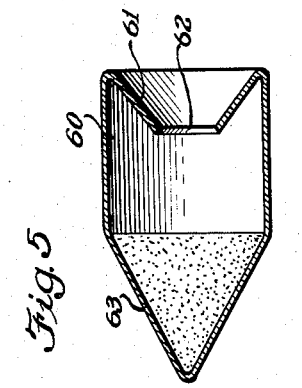
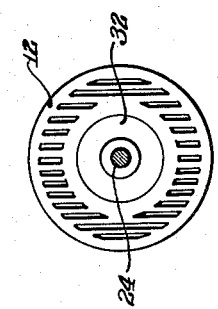
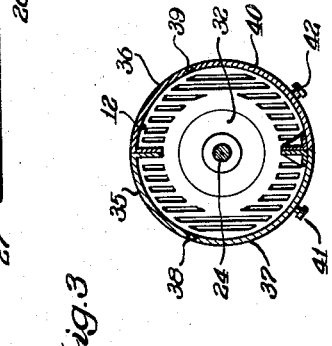
INVENTOR.
Oscar Soergel
BY
Atty.

July 11, 1950  O. SOERGEL  2,514,809
DUSTLESS HEAVY DUTY SUCTION CLEANER
Filed Dec. 5, 1945  2 Sheets-Sheet 2
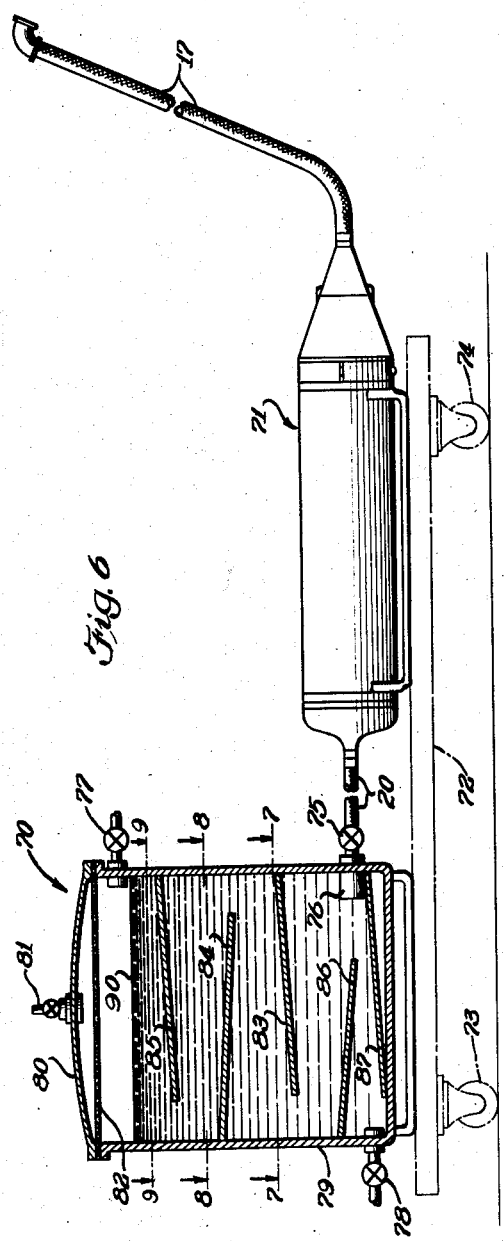
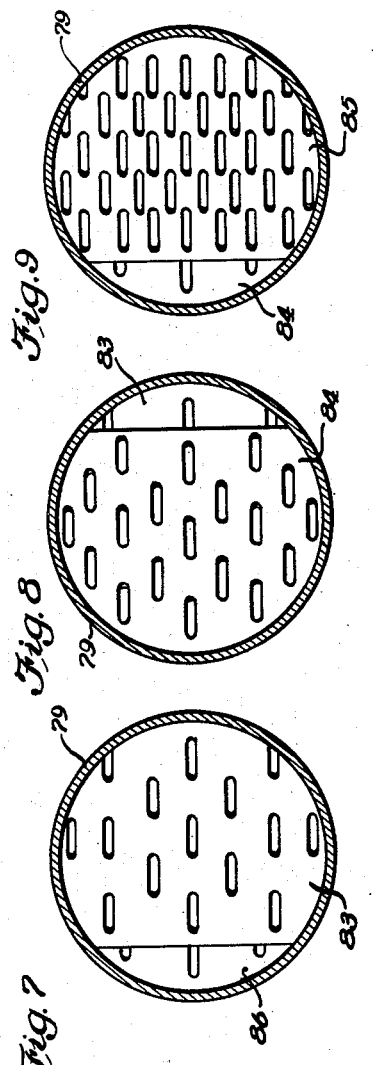
INVENTOR.
Oscar Soergel
BY
Atty.

Patented July 11, 1950

2,514,809

UNITED STATES PATENT OFFICE 2,514,809

DUSTLESS HEAVY-DUTY SUCTION CLEANER

Oscar Soergel, Chicago, Ill.

Application December 5, 1945, Serial No. 632,962

12 Claims. (Cl. 183—36)

This invention relates to cleaners, and is particularly concerned with a substantially dustless heavy duty suction cleaner.

Presently known suction cleaners, commonly referred to as vacuum cleaners, perform the cleaning operation by interposing in the path of a forced contaminated air stream, produced by a motor-driven fan, a filter bag or the like, which is intended to retain the dust particles and refuse fragments contained in the air stream and to exhaust clean air to the atmosphere.

A cleaner of this general class is inefficient and produces only an approximate and relative cleaning effect, because its operation, when considered from ideal points of view, must necessarily represent a compromise between contradictory requirements, namely, the ideal requirement for permitting unimpeded passage of the air stream—which alone can produce efficient operation and utilization of the fan and motor—coupled with the further ideal requirement for separating from the air stream all dust particles and other minute solid matter—which alone can furnish the ideally desired clean and pure exhaust air.

The compromise effected by present-day suction cleaners provides for a filter in the form of a dust bag which offers considerable resistance to the passage of the air stream and separates for such air stream the bulk—but by no means all—of the relatively coarse visible dust particles. The fan and the motor operations are consequently impeded and relatively inefficiently utilized, and a relatively great amount of minute dust particles and other solid matter are expelled with the exhaust air and are scattered into the surrounding atmosphere.

The operation of previously known suction cleaners is thus attended by detriments which will be appreciated in the light of knowledge gained in hygiene, sanitation and air-conditioning. These and related arts and sciences require cleaners which perform the desired cleaning operation without returning minute residual dust particles to the atmosphere. Hospitals, sanatoria, and numerous other public places, including hotels, restaurants and the like, and particularly places equipped for air-conditioning, may be mentioned as examples where the need for substantially dustless cleaning is desirable; public as well as private places and dwellings provided for the comfort, treatment or relief of persons afflicted with respiratory troubles, including hay fever, may be mentioned as examples where the use of such cleaners is imperative.

The principal object of the invention resides in the provision of a new suction cleaner which overcomes the previously mentioned drawbacks and meets the requirements intimated in the preceding paragraph.

This principal object is realized (1) by mounting the motor of the suction cleaner outside of the structure which forms the suction channel for the dust-laden air stream; (2) by the provision of filter means in the form of serially related strainers or traps for separating from the air stream relatively coarse refuse fragments and dust particles, in successive stages, without offering any appreciable resistance to the passage of such air stream; and (3) by the provision of a novel washer for receiving the preliminarily cleaned air stream and washing it so as to separate therefrom all residual dust particles and all residual minute solids contained therein. The maximum power of the motor and of the suction fan is in this manner substantially fully utilized and the removal of minute residual solids incident to the final washing and filtering operation furnishes the desired clean and substantially pure exhaust air.

The above noted objects and other objects and features of the invention will appear from the detailed description which is rendered below with reference to the accompanying drawings. In these drawings, Fig. 1 shows a top view of an embodiment of the new suction cleaner, with some parts in elevation and others broken away so as to indicate the structure and arrangement of interior parts;

Fig. 2 is a side view of the cleaner shown in Fig. 1, with parts in elevation and other parts broken away analogous to the showing in Fig. 1 and for the same purpose;

Figs. 3 and 4 are sections taken approximately along lines 3—3 and 4—4 in Figs. 1 and 2;

Fig. 5 shows a modified strainer or filter for use in the cleaner indicated in Figs. 1 and 2;

Fig. 6 illustrates the suction cleaner of Figs. 1 and 2 in use and connected with an embodiment of a novel washing tank; and Figs. 7, 8 and 9 are sections taken through the washing tank of Fig. 6 approximately along lines 7—7, 8—8 and 9—9 thereof.

The drawings are diagrammatic, not to scale, and are intended only for explanatory and descriptive purposes. Like reference numerals denote like parts throughout the drawings. Known details will be described merely to such extent as may be required for conveying an understanding of what is believed to be new.

The suction cleaner, as shown in Figs. 1-5, comprises a tubular housing 11 provided at one end with the strainer plate 12 which forms with the inlet plate 13 a preliminary filter chamber or trap for receiving and collecting relatively bulky or heavy refuse fragments. Secured to the inlet plate 13 are two funnels 14—15, forming branch passages which are joined in a fitting 16. To the latter is attached the usual suction hose 17. At the other end of the structure (left end as shown in Figs. 1 and 2) is attached the removable exhaust hood 18 carrying a fitting 19 to which may be secured the exhaust or discharge hose 20. Skids 26, provided with arms 27, are attached to the central housing 11, as shown in Fig. 2. Rollers may be substituted for the skids 26.

Arranged between the branch passages 14—15 and mounted on the inlet plate 13 is the motor 21. The free end of the motor may be secured by means of the brackets shown in Fig. 1 at 22—23. The motor shaft 24 extends axially inwardly, as shown, and carries the fan blades 25. The free inner end of the motor shaft 24 may be journalled in a suitable dustproof bearing mounted in the bracket 28.

Disposed within the housing 11 at the inlet side thereof (right as seen in Figs. 1 and 2) is the peripheral air flow baffle 30 having the flaring opening 31. Another central air flow baffle is provided, as indicated at 32. This latter baffle has a relatively small central opening which surrounds the motor shaft 24.

Suction is produced by the operation of motor 21 and consequent rotation of the fan blades 25. The suction is effective at the free end of the hose 17 to which may be attached a suitable nozzle. The hose and nozzle are manipulated by the operator in the usual manner to pick up dust and refuse fragments. The dust-laden air is sucked into the structure, Figs. 1 and 2, through the two branch passages 14—15 and is conducted into the preliminary filter trap or chamber extending in axial direction between the strainer plate 12 and the inlet plate 13. Bulky or heavy refuse fragments are deposited in this chamber. The remainder of the dust-laden air is propelled from this chamber through the apertures in the strainer or filter plate 12 into the interior of the housing 11 in the direction of the arrows shown in Figs. 1 and 2. A small amount of air is also sucked through the ventilating apertures at the right hand free end of the motor 21 and thence through the motor housing and through the central opening in the baffle 32 around the shaft 24, thus providing cooling air for the motor. Contamination of the motor by air carrying concentrated dust is in this manner positively prevented. The motor is accessible for repair and maintenance. The operation of the fan blades 25 sucks a maximum amount of dust-laden air through the intake hose into the branch passages 14—15 for preliminary removal of bulky refuse and thence for further filtering, as will presently appear.

The axially extending space disposed between the perforated strainer or filter plate 12 and the inlet mounting plate 13, which constitutes the preliminary filter trap or chamber, is peripherally or circumferentially defined by the upper circular sections 35—36 and by the doors 37 and 40 which are hingedly secured on the sections 35—36, respectively, at the pivot points 38—39. The door 37 is provided with a knob 41, and the door 40 with a knob 42. These doors may be spring-controlled and may be normally held in closed position, as shown in Fig. 3. Screws may be substituted for the knobs 41—42 for positive attachment and locking of the doors 37 and 40. Such screws may engage threaded holes in the frame or housing part at the bottom of the preliminary filter trap or chamber, as shown in Fig. 3. The dust-laden air stream, freed of bulky and heavy refuse fragments, is propelled through the apertures in the strainer plate 12, which permit its unimpeded passage. The bulky or heavy refuse fragments, nails, tacks, and the like, which are deposited in the preliminary filter trap, may be removed at the end of the cleaning operation by opening the doors 37 and 40.

The preliminary filter trap or chamber just described may be made of any desired size. Its width or axial extent will depend, of course, on the use to which the cleaner is put or, rather to say, on the amount of bulky or heavy refuse fragments which will be found in the refuse at any given place where the cleaner is to be used. The provision of this trap or chamber facilitates the operation of the cleaner by preventing fouling of the fan blades and fouling of the more delicate filter or strainer which is provided for separating the bulk of the dust particles from the air stream.

The last noted strainer or filter is shown in Figs. 1 and 2 at 50. It may be made of suitable filter cloth, or any desired and approved material, and may provide for relatively unimpeded passage of air; that is to say, it may be a relatively coarse filter, because the final removal of minute solids is accomplished by washing of the exhaust air. Accordingly, the filter 50 may be termed the intermediate filter. Its purpose is to separate from the air stream the bulk of dust-like matter without impeding the passage of air, so that the power of the fan and of the motor may be utilized with maximum efficiency. The filter 50, which is shown in Figs. 1 and 2 in its operative or blown-up position, is mounted on a ring-like member 51 which in turn is removably attached to the neck 52 of the tubular holder member having the wall 53 and the upturned bottom 54. The latter furnishes a central opening for the passage of the dust-laden air stream in the direction of the arrows shown in Figs. 1 and 2. The restricted neck 52 of the holder 53 is provided with a handle 55 to facilitate the operation of inserting and removing the filter 50 and the holder 53—54. The latter is removably anchored within the housing 11 in any suitable and desired manner, for example, by means of the bayonet slot shown in Fig. 2 which engages a pin projecting inwardly from the housing wall 11. The upturned bottom 54 furnishes a receptacle for receiving the bulk of dust which is separated from the air stream.

The modified intermediate filter or strainer shown in Fig. 5 may be used in place of the one indicated in Figs. 1 and 2 and described above. It comprises the tubular holder 60 which corresponds to the section 53 of the previously described structure. The end of the tubular section 60 is turned inwardly at an angle, as indicated at 61, furnishing a flange having the central hole 62 for the passage of the dust-laden air stream to the intermediate filter. The cone-shaped end 63 may be perforated as desired for the substantially unimpeded passage of the air stream and separation of the bulk of dust particles therefrom, which is deposited within the spaced defined by the flanged end 61. The structure, Fig. 5, may be made of any suitable material, including stamped metal. The modified intermediate filter is attached and removed from the cleaner housing in the same manner as the previously described filter shown in Figs. 1 and 2. A suitable handle or knob may be provided to facilitate insertion and removal.

The generally radially inwardly directed flange at the end of the tubular intermediate filter holder shown either in Figs. 1 and 2 or in Fig. 5 also furnishes a flow control for the stream of air through the cleaner. It forms a definite inlet at one end of a chamber which carries the filter 50 (or 63) at its other end. The air can expand in this chamber and the particles rejected by the filter can settle in the annular chamber space without clogging the filter.

The exhaust air containing a certain amount of residual dust is expelled from the cleaner, Figs. 1 and 2, through the exhaust hose 20.

The cleaner structure, as described so far, may be used by itself in the orthodox fashion and with an orthodox filter cloth in place of the intermediate filter members shown at 50 and 63, respectively. When considered as a separate and independently operating unit it will furnish the following advantages as compared with prior structures: (1) the mounting of the motor outside of the channel which carries the dust-laden air stream saves the motor, prevents trouble, provides accessibility for repair and maintenance; (2) the provision of the preliminary filter chamber or trap disposed between the plates 12—13 separates from the dust-laden air stream bulky and relatively heavy refuse fragments, thus preventing propulsion of such fragments through the fan blades, which may cause damage, and also preventing propulsion of such articles to the relatively delicate filter 50 shown in Figs. 1 and 2 which now is assumed to be the final filter; and (3) the provision of the pot-like holder such as 53 in Figs. 1 and 2 and 60 in Fig. 5 provides a receptacle in which the dust and minute refuse fragments separated from the air stream are definitely deposited. This last noted feature facilitates the removal of the filter and its supporting structure for the purpose of disposing of the dust separated from the air stream. The preliminary removal of bulky and heavy particles combined with the mounting of the motor will result in more efficient overall operation.

The operation of the suction cleaner in the orthodox manner, as indicated in the preceding paragraph, will, however, be attended by the detriment common to all known suction cleaners; namely, the exhaust air will not be entirely clean, and dust particles are thus again scattered into the surrounding atmosphere. This detriment is overcome by the provision of the washer generally indicated in Fig. 6 by the numeral 70. The suction cleaner just described is generally indicated in Fig. 6 by the numeral 71. The two devices, namely, the suction cleaner 71 and the washer 70, may be separate and interconnected by the hose 20 or they may be mounted on a common base shown in dotted lines and indicated in Fig. 6 at 72, which may be provided with suitable rollers 73—74, thus forming a convenient operating unit.

The washer 70 comprises the tank 79 provided with the valved inlet 75 connected with the suction cleaner 71. Numeral 76 indicates a check valve which permits the air stream from the suction cleaner to enter but prevents the water in the tank 79 from flowing back into the hose 20. The valved inlet 77 is provided for filling the tank 70 with water and for washing it after the cleaning operation. A valved outlet 78 is provided for draining the tank. The lid or cover 80 is equipped with a vent valve 81 for the escape of clean exhaust air. A filter cloth 82 may be used if desired. A length of hose may be furnished for permanent use with the water inlet 77, and a similar length of hose for use with the drain 78. Suitable hooks or hangers may be provided on the tank wall for supporting these pieces of hose.

The particularly novel feature in connection with the washer 70 resides in the arrangement of a number of flow-distributing or bubble plates such as 83, 84 and 85 and flow control plates or shelves 86—87. As shown in Figs. 7, 8 and 9, the flow control or bubble plates 83—85 are provided with apertures or openings of upwardly increasing number so as to break up the incoming air stream into a progressively increasing number of bubbles which percolate through the body of water 90 upwardly for passage through the filter cloth 82 and finally for discharge through the vent valve 81 to the atmosphere. The shelves or bubble plates are tilted downwardly in alternate direction so as to force the air stream injected through the check valve 76 to meander upwardly covering a labyrinth path extending throughout the body of cleaning liquid. The tilted position of these plates or shelves also facilitates the washing of the tank and the discharge of the contaminated water therefrom at the refuse of the contaminated water therefrom at the conclusion of the suction cleaning operation.

The operation of the structure will be clear from the foregoing description, but may be briefly summarized as follows:

The tank 79 is first filled with water up to approximately the line 90 shown in Fig. 6, whereupon the valve 77 is closed. The tank is then connected with the suction cleaner 71 by opening the valve 75. The check valve 76 prevents backflow of the water in the direction of the suction cleaner. The motor 21 (Figs. 1 and 2) of the suction cleaner is then started through the medium of a suitable switch, and the suction cleaning operation can proceed as previously described. The dust-laden air stream is directed first through the preliminary filter trap or chamber where bulky and heavy refuse fragments are deposited, then through the intermediate strainer or filter which separates the bulk of the dust, and the exhaust air from the suction cleaner then enters the body of water in the tank 79, at the bottom thereof, through the check valve 76, for the final removal of residual dust and purification of the air stream before it is exhausted to the atmosphere.

In the absence of any other provisions, the continuously supplied large amount of air would simply percolate through the body of water in the washing tank in large and unwieldy blobs which would explode on top of the body of water, providing a great deal of surface turbulence and scattering of dust at the surface. Cleaning of an air stream in such primitive manner would require a very large amount of water. In the present case the amount of water required for cleaning is kept at a minimum. The dust-laden air stream enters the liquid in the tank, producing turbulence which is upwardly deflected by the shelf 86. Air entering underneath the shelf 86 is broken up into a number of bubbles which escape upwardly through vent holes provided in such shelf. The air bubbles urging upwardly through the liquid can pass through the holes in the bubble plate 83 and upwardly to the left around the edge of the plate 83. In the next stage the bubbles which have already been broken up urge upwardly against the bottom of the plate 84 and escape upwardly through the holes in this bubble plate, which are greater in number than the holes in the bubble plate 83. Some of the air bubbles will also go upwardly around the right edge of the bubble plate 84. The last stage provides for a similar breaking up of the air bubbles by the numerous holes in the bubble plate 85. By this time the bubbles have been broken up to such extent that they escape upwardly to the surface of the liquid without causing any detrimental surface ebullition or turbulence. Due to the breaking up of the air bubbles and the meandering labyrinth path in which they are forced upwardly through the liquid, substantially all solid matter is washed from them, taken up by the liquid, and clean air escapes from the surface of the liquid. In places where exceedingly pure air is required, the tank may also be provided with the filter cloth 82 which effects a final cleaning and filtering of the air. The clean air then escapes through the vent valve 81.

The filter 82 may be a chemically treated cloth or the like for effecting a final germicidal treatment of the escaping air or for scenting the cleaned exhaust air as desired.

The washing tank 79 is shown to be of circular form but, of course, may be made rectangular or any other suitable shape. The bubble plates 83—85 are shown to be provided with apertures in the form of slots. Round holes may be provided instead of the slotted apertures. The holes may also increase in size in the upwardly successive bubble plates. For example, the holes in the bubble plate 83 may be of relatively large size, the holes in bubble plate 84 of intermediate size, and the bubble plate 85 may carry a great number of small holes. Only three bubble plates are shown in the drawing of the bubble tank. Their number may be increased as desired.

The suction cleaner 71 has been shown of circular shape, but may likewise be constructed differently and may be of rectangular shape or cross-sectionally oblong or the like.

The invention has been described in connection with a heavy duty cleaner, particularly for public places for which it is primarily intended. It will be appreciated, of course, that the invention is not limited to such use, but that the cleaner may be made for domestic use.

Generally speaking, any body of water through which the exhaust air from the suction cleaner is vented will produce some cleaning of the air stream. Thus, the exhaust air could be vented, in the absence of a washing tank such as disclosed herein, through a body of water in a sink or through the body of water in a toilet. A cover should be used in such makeshift operations, through which the exhaust hose 20 is directed to submerge its free end in the body of water. The use of the bubble tank shown in Figs. 6-9, inclusive, is, of course, preferred for obvious reasons, as indicated before.

A chemical solution may be used in place of the body of water in the washing tank, or the body of water may be treated to provide a germicidal effect or to scent the pure exhaust air as desired.

The contaminated washing liquid in the tank is disposed of, after completion of the cleaning operation, by wheeling the apparatus shown in Fig. 6 to the place of disposal, e. g., to a washroom. The hose attached to the valve 78 is placed in the drain and the valve is opened to permit emptying of the tank. The hose attached to the valve 77 is then connected to a water faucet which is opened to wash the tank. The water cascades down from shelf to shelf, washing the entire interior structure in obvious manner.

Changes may be made within the scope and spirit of the appended claims which define what is believed to be new and desired to have protected by Letters Patent of the United States.

I claim:

1. In a suction cleaner having a tubular housing containing a fan for producing suction therethrough and a filter for extracting dust particles from an air stream directed therethrough by the operation of said fan and being provided with a motor for operating said fan, a device for mounting said motor outside of said housing comprising an inlet mounting plate disposed at the suction end of the housing, means for mounting said motor on said inlet mounting plate and axially projecting therefrom, and air inlet means forming branch passages connected with said inlet mounting plate and extending generally in parallel with said motor outside thereof.

2. In a suction cleaner having a tubular housing containing a filter for extracting dust particles from an air stream directed therethrough, a device disposed at the suction end of said housing in the path of said air stream for preliminarily removing relatively coarse refuse from said air stream, said device comprising an apertured strainer plate disposed at the suction end of said housing in a plane perpendicular to the direction of flow of said air stream, an air inlet plate axially spaced from said strainer plate and extending substantially in parallel therewith, a peripheral shell connecting said strainer plate and said inlet plate and forming an annular chamber therewith, and doors in said shell for gaining access to said chamber.

3. For use in a suction cleaner having a tubular housing and means for producing suction to draw an air stream therethrough, a filter device removably disposed in said housing, said device comprising a tubular holder removably disposed in said housing in slidable engagement with the inner wall thereof, filter means carried by said holder at the pressure end thereof, and a radially and axially inwardly extending flange disposed at the suction end of said holder integral therewith and forming with the tubular body thereof an annular peripheral space for the deposit of dust particles rejected by said filter.

4. In a suction cleaner having a tubular housing and means for producing suction to draw an air stream therethrough, a filter device removably disposed in said housing, said device comprising a tubular holder removably disposed in said housing, filter means removably disposed on said holder at the pressure end thereof, and a radially inwardly directed and axially angularly inwardly extending flange formed by said tubular holder at the inlet end thereof integral therewith to direct the air stream centrally axially toward said filter means and to form with the tubular body of the holder an annular space for receiving dust and refuse particles rejected by said filter means.

5. In a suction cleaner having a tubular housing and means for producing suction to draw a contaminated air stream therethrough and provided with filter means near the pressure side thereof for extracting dust particles from such air stream, a device for directing said air stream axially toward said filter means, said device comprising a plurality of axially serially related tubular progressively radially inwardly narrowing baffle means disposed in said housing for directing the inlet air stream to flow centrally axially in the direction of said filter means.

6. In a suction cleaner, means forming an inlet for connection with a suction hose, a pair of funnels forming branch passages extending from said inlet at an angle thereto, a mounting plate for securing said branch passages, a motor secured to said mounting plate and disposed between said branch passages, a strainer plate disposed in axially spaced relation with respect to said mounting plate and forming a chamber therewith, and a tubular housing extending from said strainer plate, the shaft of said motor extending axially through said chamber into said housing and carrying a fan disposed therein for producing suction effective to said hose by way of said chamber and said branch passages.

7. The structure and combination defined in claim 6, together with baffle means disposed in said housing and extending from said strainer plate for drawing air inwardly along said motor shaft to cool said motor.

8. A suction cleaner of the class described comprising a tubular substantially cylindrical housing having an inlet at one end and an outlet at the other end, a tubular substantially cylindrical refuse holder removably disposed within said housing and axially extending thereinto for a substantial portion thereof with its wall in slidable engagement with the inside wall of said housing, a filter removably secured to said holder at the outer end thereof which is closest to the outlet of said housing, said filter being removable with said holder, the inner ends of said holder being turned radially and axially inwardly with respect to the tubular wall thereof to form an integral flange which extends axially inwardly of said tubular holder body to form therewith an annular receptacle in which refuse matter is deposited which is rejected by said filter.

9. For use in a suction cleaner of the class described, wherein an air stream is axially directed from the suction end into and through a tubular housing for exit therefrom at the opposite pressure end thereof, a filter unit for disposal in the path of said air stream, said filter unit comprising a tubular refuse holder for insertion into and removal from said housing, a radially and axially inwardly directed flange formed at the inner end of said holder integral therewith and forming thereat a peripheral annularly and axially extending space and a central radially restricted intake opening for directing said air stream centrally axially toward the pressure end, and a filter member removably disposed at the outer end of said holder and being removable therewith, refuse particles rejected by said filter being deposited within said annular peripheral space of said holder to prevent clogging of said filter member by such rejected particles.

10. In a suction cleaner of the class described, a tubular housing, an air inlet at one end of said housing, fan blades in said housing, and means including a shaft for rotating such blades to produce suction effective at said inlet so as to draw an air stream into said housing, a tubular baffle disposed in said housing near the inlet end thereof, said baffle extending within said housing from a point near the inlet end axially inwardly and forming around a portion of said shaft and around said fan blades a gradually radially inwardly converging tubular shield having at its free inner end a radially outwardly flaring mouth, and a second baffle in said housing axially spaced from said flaring mouth of said first baffle and forming an axially and radially inwardly directed restricted opening for directing said air stream centrally axially toward said outlet.

11. The structure and combination defined in claim 10, together with a filter element, and means associated with said second baffle and forming a radially inwardly disposed annular holder for securing said filter element.

12. In a suction cleaner having an elongated tubular housing for the passage of a forced air stream axially therethrough from one end thereof which forms an inlet to the other end which forms an outlet, first tubular baffle means disposed in said housing near the inlet end thereof for accelerating said air stream, second baffle means disposed in said housing axially spaced from the inner end of said first baffle means for further accelerating said air stream, and means associated with said second baffle means and forming a chamber for allowing expansion of said air stream, and filter means.

OSCAR SOERGEL.

REFERENCES CITED

The following references are of record in the file of this patent:

UNITED STATES PATENTS

| Number | Name | Date |
|---|---|---|
| 67,576 | Pease | Aug. 6, 1867 |
| 608,397 | Schwartz | Aug. 2, 1898 |
| 744,645 | Thurmans | Nov. 17, 1903 |
| 971,044 | Hutchinson | Sept. 27, 1910 |
| 978,739 | Griswold et al. | Dec. 13, 1910 |
| 980,977 | Little | Jan. 10, 1911 |
| 1,448,322 | Wirls | Mar. 13, 1923 |
| 1,458,720 | Malone | June 12, 1923 |
| 1,904,667 | Smith | Apr. 18, 1933 |
| 2,266,075 | Replogle | Dec. 16, 1941 |
| 2,314,986 | Johnson | Mar. 30, 1943 |

FOREIGN PATENTS

| Number | Country | Date |
|---|---|---|
| 555,647 | Great Britain | Sept. 1, 1943 |